(12) United States Patent
Butterworth et al.

(10) Patent No.: US 8,239,707 B2
(45) Date of Patent: *Aug. 7, 2012

(54) REPLICATED STATE MACHINE

(75) Inventors: Henry E. Butterworth, Eastleigh (GB); Paul J. Quelch, Emsworth (GB)

(73) Assignee: International Business Machines Corporation, Armonk, NY (US)

( * ) Notice: Subject to any disclaimer, the term of this patent is extended or adjusted under 35 U.S.C. 154(b) by 831 days.

This patent is subject to a terminal disclaimer.

(21) Appl. No.: 12/144,041

(22) Filed: Jun. 23, 2008

(65) Prior Publication Data

US 2008/0256543 A1    Oct. 16, 2008

Related U.S. Application Data

(63) Continuation of application No. 11/076,258, filed on Mar. 9, 2005, now Pat. No. 7,421,616.

(51) Int. Cl.
*G06F 11/00* (2006.01)
(52) U.S. Cl. .......................................... 714/11; 718/102
(58) Field of Classification Search .................... 714/11, 714/12, 13, 10, 6.3; 718/102, 103
See application file for complete search history.

(56) References Cited

U.S. PATENT DOCUMENTS

| | | | |
|---|---|---|---|
| 5,437,032 A * | 7/1995 | Wolf et al. ..................... | 718/103 |
| 6,065,036 A | 5/2000 | Hisatake | |
| 6,076,174 A | 6/2000 | Freund | |
| 6,223,201 B1 * | 4/2001 | Reznak ......................... | 718/102 |
| 6,223,205 B1 * | 4/2001 | Harchol-Balter et al. .... | 718/105 |
| 6,263,359 B1 * | 7/2001 | Fong et al. .................... | 718/103 |
| 7,076,781 B2 | 7/2006 | Skovira | |

OTHER PUBLICATIONS

Lamport, L. - "The Part-Time Parliament," Sep. 1, 1989; The Systems Research Center, Digital Equipment Corporation 1989; pp. 1-42.
Schneider, F.—"Implementing Fault-Tolerant Services Using the State Machine Approach: A Tutorial"; Dept. of Computer Science, Cornell University; ACM Computing Surveys, vol. 22, No. 4, Dec. 1990; pp. 300-319.

* cited by examiner

*Primary Examiner* — Dieu-Minh Le
(74) *Attorney, Agent, or Firm* — Yudell Isidore Ng Russell PLLC

(57) ABSTRACT

A replicated state machine includes multiple state machine replicas. In response to a request from a client, the state machine replicas can execute a service for the request in parallel. Each of the state machine replicas is provided with a request manager instance. The request manager instance includes a distributed consensus means and a selection means. The distributed consensus means commits a stimulus sequence of requests to be processed by each of the state machine replicas. The selection means selects requests to be committed to the stimulus sequence. The selection is based on an estimated service time of the request from the client. The estimated service time of the request from the client is based on a history of service times from the client provided by a feedback from the state machine replicas. As such, requests from multiple clients are serviced fairly.

10 Claims, 5 Drawing Sheets

REPLICATED STATE MACHINE

PRIORITY CLAIM

The present application is a continuation of U.S. patent application Ser. No. 11/076,258, filed on Mar. 9, 2005 now U.S. Pat. No. 7,421,616, and entitled, "Replicated State Machine," which is incorporated herein by reference.

BACKGROUND OF THE INVENTION

1. Technical Field

The present invention relates to state machines in general and, in particular, to replicated state machines. Still more particularly, the present invention relates to a replicated state machine for providing fault-tolerant services.

2. Description of Related Art

Replicated state machines can be used to provide fault-tolerant services as described in F. B. Schneider, *Implementing Fault-tolerant Services using the State Machine Approach: A Tutorial*, ACM Computing Surveys, 22(4), December 1990, pp. 299-319. The above-mentioned reference defines distributed software as often being structured in terms of clients and services. Each service includes one or more server and exports operations that clients invoke by making requests. Using a single centralized server is the simplest way to implement a service; however, the resulting service can only be as fault-tolerant as the processor executing that server. Multiple servers that fail independently can be used to provide fault-tolerance service. Such is done by replicating the single server and executing the replicas on separate processors of a distributed processing system.

State machine approach refers to a method of implementing a fault-tolerant service by replicating servers and coordinating client interactions with the server replicas. With the replicated state machine approach, the service is expressed as a deterministic state machine and copies of the state machine are executed in a number of different failure domains in parallel. For example, the copies of the state machine may be executed on several different computers in parallel. Clients express their requests in terms of state machine stimuli that are committed to a sequence of such stimuli using a distributed consensus protocol. An example of a distributed consensus protocol is the PAXOS protocol as described in L. Lamport, *The part-time parliament*, Technical Report 49, DEC SRC, Palo Alto, 1989.

The distributed consensus protocol ensures that all state machine replicas receive the same sequence of stimuli and since, by design, they all start off with the same state and are deterministic, the state machines continue to execute as replicas of one another indefinitely. Fault-tolerance is essentially achieved because one copy of the state of the service is held by each replica so it does not matter if a subset of the replicas fail since a copy of the service state will be retained in a surviving replica.

Replicated state machines are a good way of implementing fault tolerant service, but the problem is that a client, which is making many requests, may starve other clients of access to the service completely or may increase the service time for other clients beyond what is acceptable to them. As an example, replicated state machines can be used in a storage area network (SAN). The virtualization component of a SAN provides an abstraction of the storage where the representation of a storage unit to the operating system and applications on a server is divorced from the actual physical storage where the information is contained. The virtualization component is a client of the replicated state machine services. In prior art systems, the virtualization component carries out a lot of requests that starve the other components, such as the configuration component, of request processing capability. This results in configuration request timeouts, input/output timeouts and general instability.

Consequently, it is desirable to provide an improved replicated state machine that can schedule requests from clients such that all clients can be serviced fairly.

SUMMARY OF THE INVENTION

In accordance with a preferred embodiment of the present invention, a replicated state machine includes multiple state machine replicas. In response to a request from a client, the state machine replicas can execute a service for the request in parallel. Each of the state machine replicas is provided with a request manager instance. The request manager instance includes a distributed consensus means and a selection means. The distributed consensus means commits a stimulus sequence of requests to be processed by each of the state machine replicas. The selection means selects requests to be committed to the stimulus sequence. The selection is based on an estimated service time of the request from the client. The estimated service time of the request from the client is based on a history of service times from the client provided by a feedback from the state machine replicas. As such, requests from multiple clients are serviced fairly.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

A distributed computer system allows clients request operations to be carried out by a service. The clients may be applications running on distributed processors in the form of client devices. The service is carried out by more than one server to provide a fault-tolerant system in the form of a replicated state machine.

Figure 1:
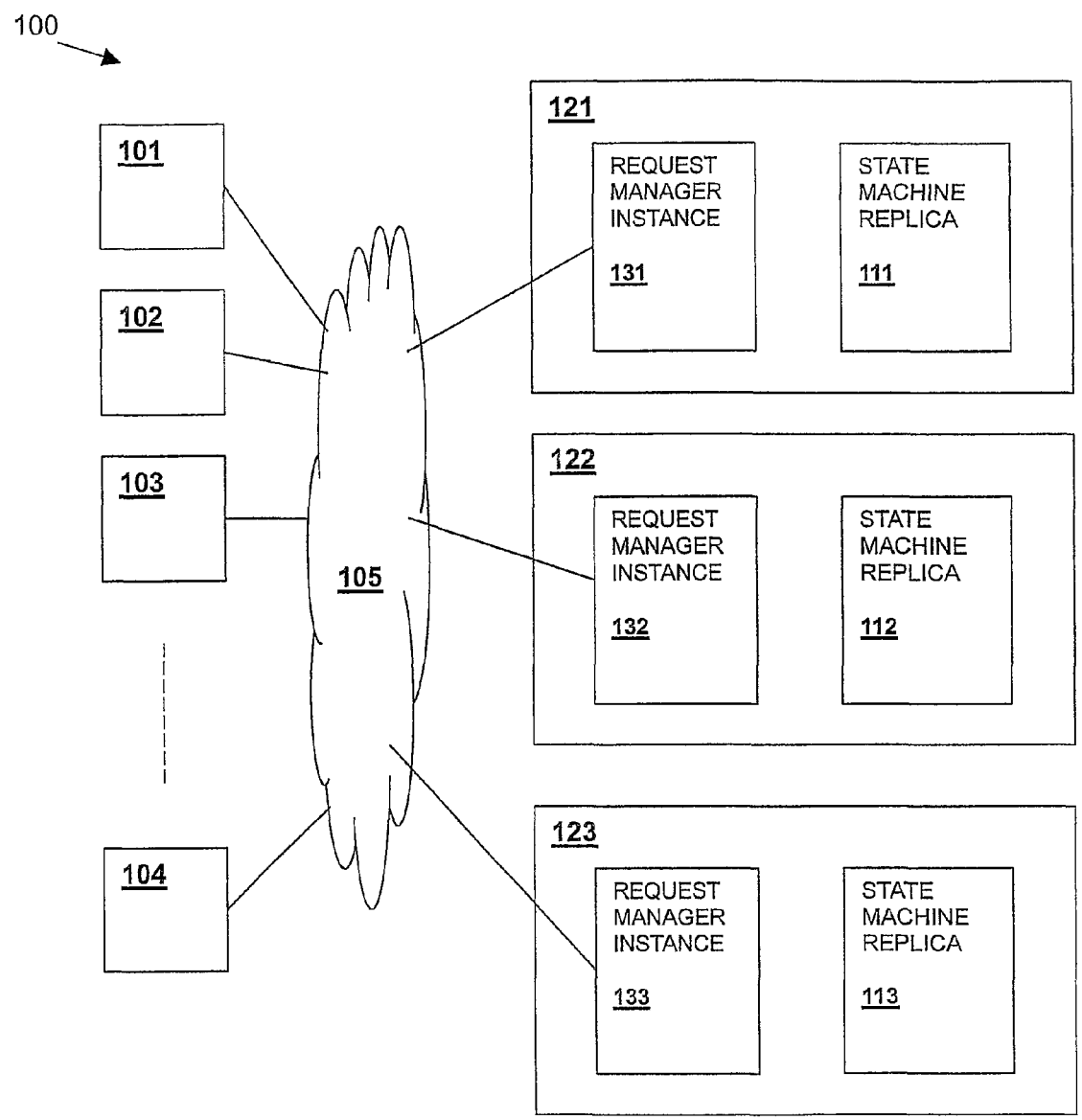
FIG. 1 is a block diagram of a distributed computer system in which a preferred embodiment of the present invention may be implemented.

Referring now to the drawings and in particular to FIG. 1, there is depicted a block diagram of a distributed computer system in which a preferred embodiment of the present invention may be implemented. As shown, a distributed computer system 100 includes clients 101-104 that interact with a service via a network 105. In order to provide a fault-tolerant service, state machine replicas 111-113 are provided within distributed computer system 100. Each of state machine replicas 111-113 is respectively executed on a separate processor 121-123, and replicates an image of a single server providing a service to all of the clients.

Clients 101-104 submit their requests to a request manager component for servicing clients 101-104. Instances 131-133 of the request manager run for state machine replicas 111-113, respectively. For example, as shown in FIG. 1, instances 131-133 of the request manager running on processors 121-123 as state machine replicas 111-113, respectively. A distributed consensus protocol is used to coordinate request manager instance interactions with state machine replicas 111-113.

Figure 2:
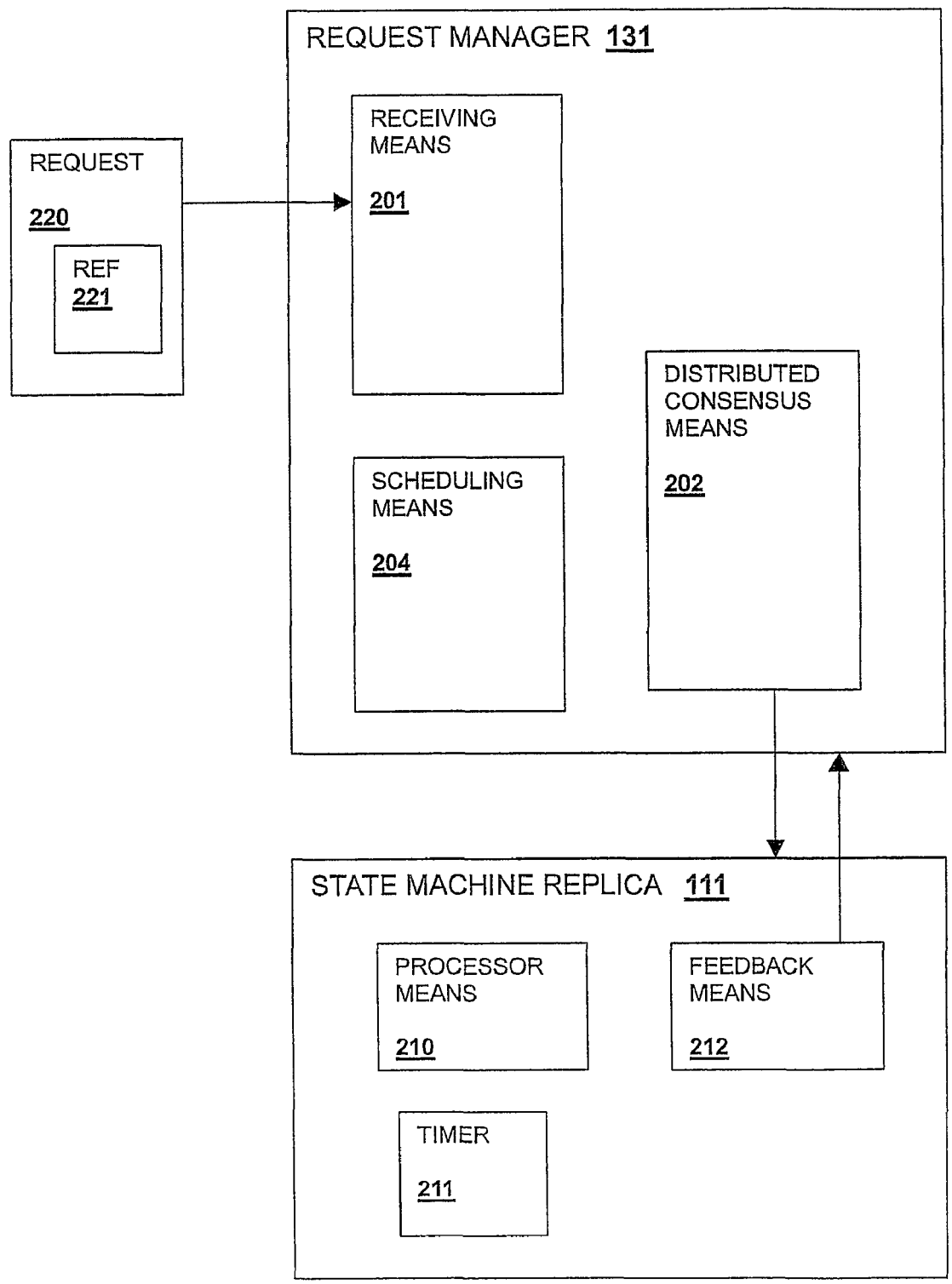
FIG. 2 is a block diagram of a request manager and a state machine replica, in accordance with a preferred embodiment of the present invention.

With reference now to FIG. 2, there is depicted request manager instance 131 that manages requests to state machine replica 111. The requests can be sent from multiple clients, as shown in FIG. 1. Request manager instance 131 has a receiving means 201 for receiving requests from clients. A distributed consensus means 202 is provided on request manager instance 131 that performs the distributed consensus protocol in conjunction with other distributed consensus means instances on different processors 121-123 and passes the resulting stimulus sequence to state machine replica 111. Request manager instance 131 also includes a feedback receiving means 201 for receiving feedback from state machine replica 111 regarding the servicing time for a request from a particular client. Request manager instance 131 includes a scheduling means 204 for scheduling requests to be committed to the stimulus sequence by distributed consensus means 202 and applying feedback from state machine replica 111.

State machine replica 111 includes a processor means 210 for processing requests from clients. State machine replica 111 also includes a timer 211 for timing the processing of a request from a particular client and a feedback means 212 for sending feedbacks to request manager 131 regarding the service times.

A request 220 sent by a client is tagged with a reference 221 to the client from which request 220 was originated. Reference 221 is an identifier that uniquely identifies the client. Receiving means 201 of request manager 131 distinguishes requests originating from different clients and processes the requests according to an estimated service time for a request from a particular client. The estimated service time for a request from a particular client is maintained based on the feedback received from state machine replica 111.

Figure 3:
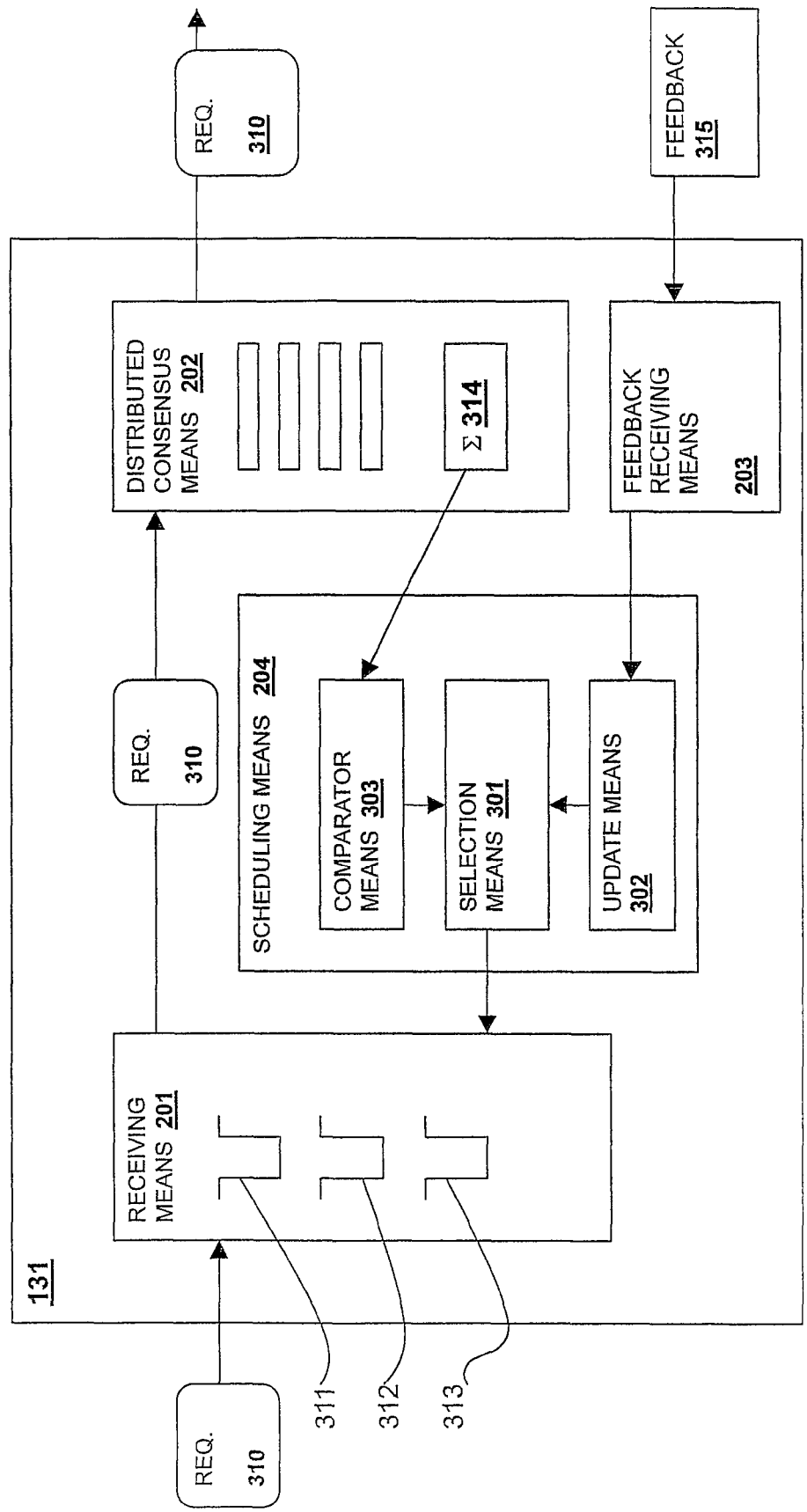
FIG. 3 is a detailed block diagram of the request manager from FIG. 2, in accordance with a preferred embodiment of the present invention.

Referring now to FIG. 3, there is illustrated the operations of request manager 131 in more detail. Receiving means 201 includes client queues 311-313 for receiving requests from each client. The client from which a request is originated can be identified by the reference tagged to the request.

Distributed consensus means 202 receives a request 310 from one of queues 311-313 of receiving means 201 when request 310 is scheduled for processing by scheduling means 204. Distributed consensus means 202 maintains a list of requests it has outstanding that are in the process of being committed to the stimulus sequence or waiting in the stimulus sequence to be sent to a replica.

Scheduling means 204 of request manager 131 includes a selection means 301 for selecting a request from one of client queues 311-313 for forwarding to distributed consensus means 202 to be committed to the stimulus sequence.

Selection means 301 selects one of client queues 311-313 with the probability of selecting a client queue being based on the inverse of the estimated service time of a request from that client. This probability is maintained by selection means 301 by processing a feedback 315 from the replica regarding the service time of a request from a particular client. As requests 310 are tagged with a reference for the client from which the request was originated, the replica is able to return feedback 315 to request manager 131 providing service times for each request processed. Feedback 315 is received at feedback receiving means 203 and passed to an updating means 302 that updates a log of the estimated time of each client's requests that is forwarded to selection means 301 to maintain the probability of selection.

A request 310 is only passed on to be committed to the stimulus sequence by distributed consensus means 202 if an outstanding service time threshold has not been exceeded. The estimated service times of the requests that are outstanding in distributed consensus means 202 are summed, and a sum 314 is compared by a comparator means 303 with a threshold service time. Sum 314 is maintained by distributed consensus means 202 being increased when a new request is received and reduced when a request has been processed by the replica.

Requests are scheduled in accordance with the following rules:

1. The service time required for each request from a client is estimated based on the history of service times for requests from that client. This allows the solution to make non-deterministic scheduling decisions before committing requests to the stimulus sequence after which time any decisions would have had to have been deterministic.
2. The amount of outstanding service time represented by requests committed to the stimulus sequence but not yet serviced is limited. This prevents a busy client from filling up the stimulus sequence and so reduces the worst case request latency for less busy clients.
3. Requests are selected to commit to the stimulus sequence with priority inversely proportional to the estimate of service time required. This ensures that all clients receive a fair share of the service processing capability by sharing the capability equally between competing clients.
4. The system starts by assuming a worst-case initial estimate for a client's request service time. This eliminates fairness problems when the system starts due to initially inaccurate estimates.

Each of the above-mentioned rules is described in more detail as follows:

I. Rule 1

The service time required for each request from a client is estimated based on the history of service times for requests from that client.

Clients submit their requests to a request manager component for servicing. An instance of the request manager runs for each of the state machine replicas and all may be operational simultaneously.

a. Requests are tagged with an identifier that uniquely identifies the client and passed to a request manager.
b. Subsequently (see below), the request manager schedules the request to be committed to the stimulus sequence.
c. The request is serviced by all state machine replicas. Request processing is timed at each replica. The time taken to process the request by a replica is returned to the local request manager along with the identifier of the client as feedback for the request manager's service time estimate for the requests issued by that client.

d. The request manager incorporates the feedback into its estimate. In a preferred embodiment, an estimate E is maintained where, for a given feedback F, the new estimate E=E*0.9+F*0.1. In an alternative embodiment, the initial estimate before any feedback has been received is chosen as described below. The alternative implementation is an example of an infinite impulse response filter that will continually track the expected service time even if the nature of requests issued by the client changes.

Figure 4:
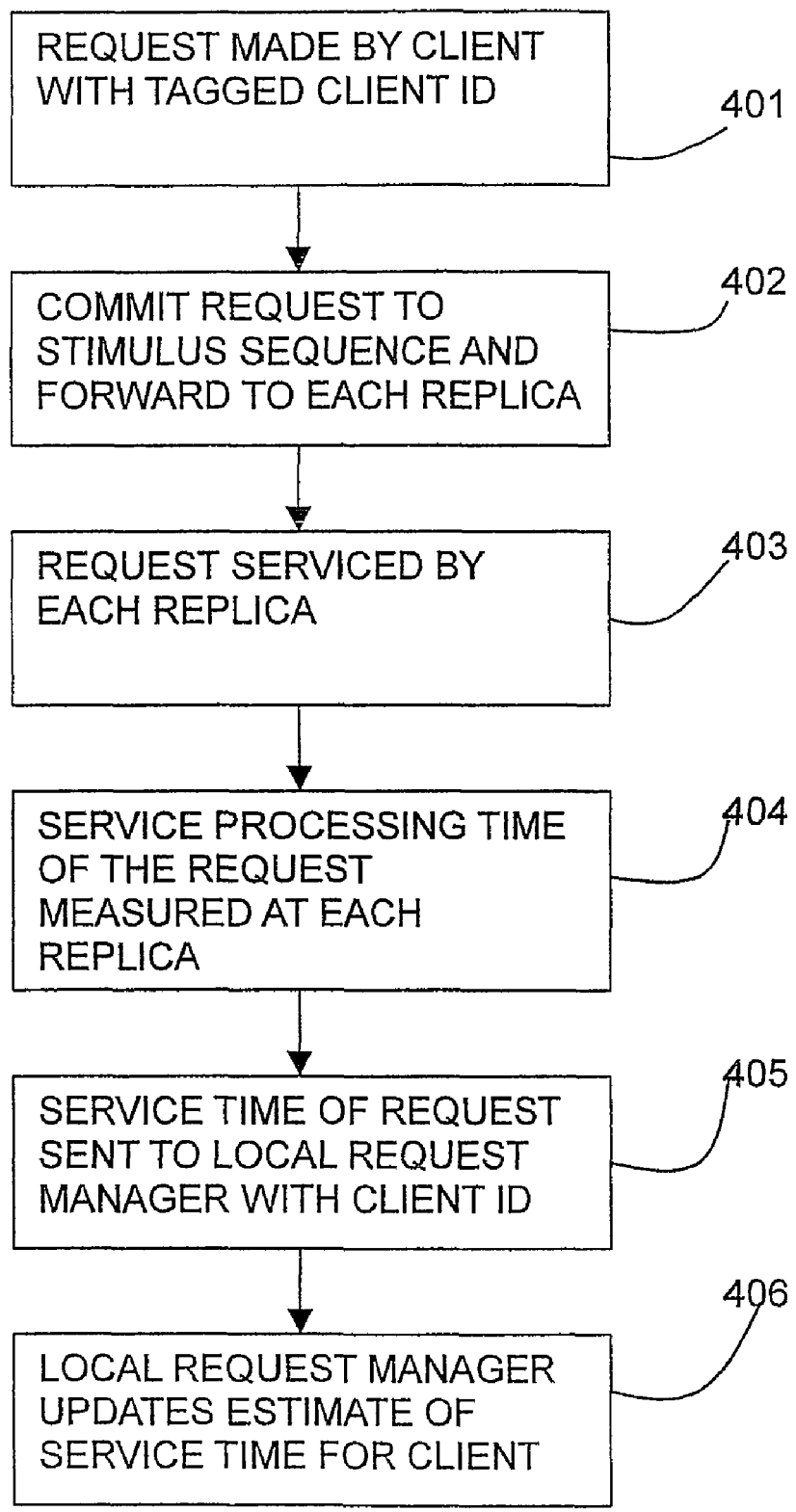
FIG. 4 is a high-level logic flow diagram of a method for requesting a service and for providing feedback regarding the service time, in accordance with a preferred embodiment of the present invention.

With reference now to FIG. 4, there is depicted a high-level logic flow diagram of a method for processing a request and maintaining estimated service times for requests originating from a client. A request is made by a client with the client identifier tagged to the request, as shown in block 401. The request is committed to the stimulus sequence using the distributed consensus protocol and forwarded by each local request manager to its replica, as depicted in block 402. The request is serviced by each replica, as shown in block 403. The service processing time of the request is then measured at each replica, as depicted in block 404. The service time for the request is sent to the local request manager with the client identifier, as shown in block 405. The local request manager updates its estimate of service time for that client, as depicted in block 406.

II. Rule 2

The amount of outstanding service time represented by requests outstanding in the distributed consensus protocol or committed to the stimulus sequence but not yet serviced is limited.

a. The request manager has an outstanding service time threshold (which may be implemented as a fixed constant chosen to allow enough request parallelism in the distributed consensus protocol to yield good throughput). This threshold may be implemented as a single limit for all the request manager instances but, to avoid having to communicate amongst instances, it is simplest to implement a limit per request manager instance and have them proceed independently.

b. The request manager receives requests from clients and decides when to pass them on to be committed to the stimulus sequence. The request manager can delay requests for as long as it likes by (for example) queuing them and subsequently de-queuing them.

c. When the request manager decides (see below) to pass a request on to be committed to the stimulus sequence, it looks up the estimate of the service time required by the request and adds that estimate to a sum of the estimates of the service time required by all requests it has outstanding. The request manager is notified when a request completes so can decrement its sum of outstanding service time estimates at that point.

d. When the sum of the service time estimates for all of the outstanding requests exceeds the outstanding service time threshold, the request manager stops passing requests on to be committed to the stimulus sequence and only resumes once enough requests have been serviced to bring the sum of the service time estimates back down below the threshold again.

Figure 5:
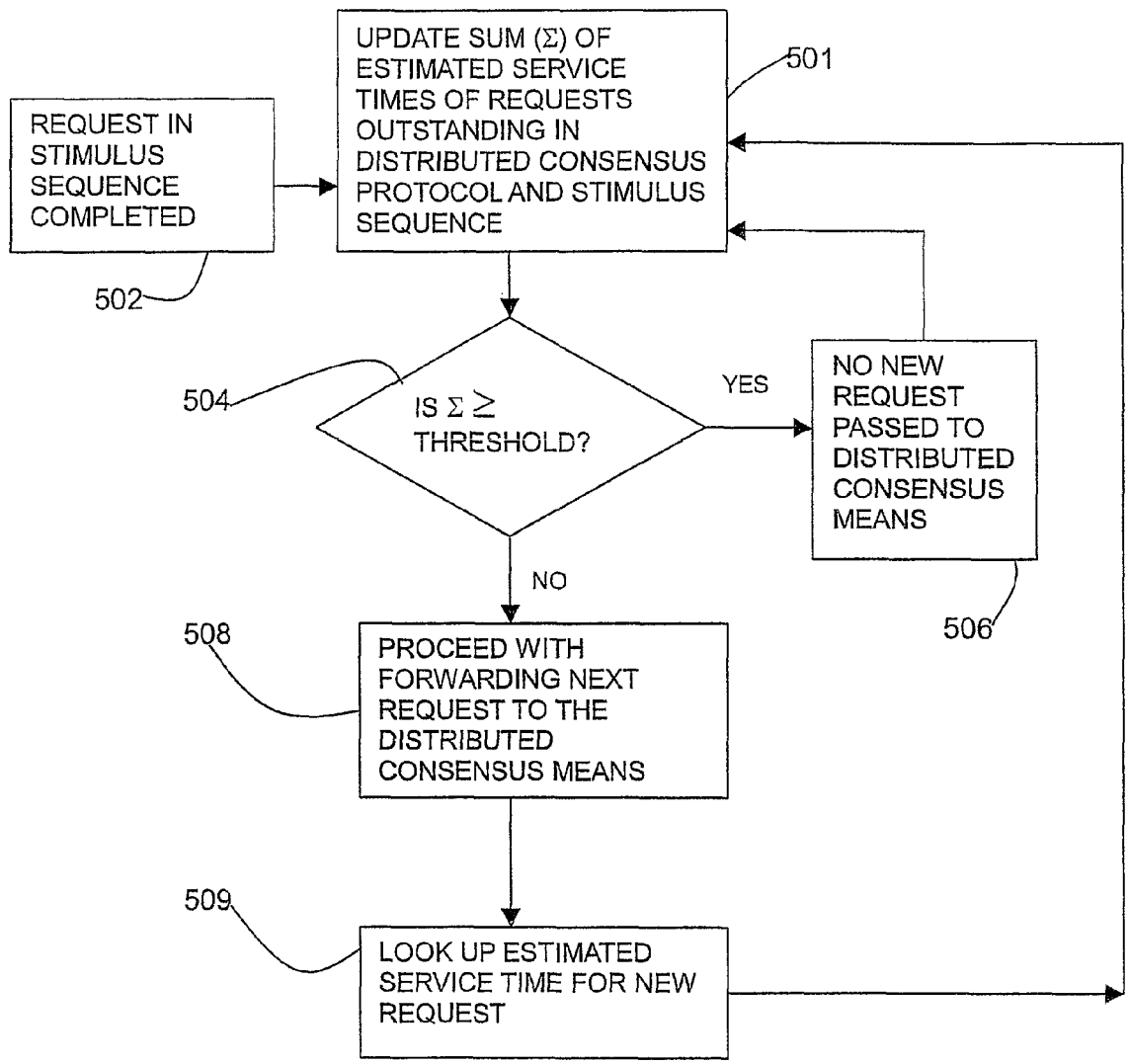
FIG. 5 is a high-level logic flow diagram of a method for determining when to forward a request to be processed, in accordance with a preferred embodiment of the present invention.

Referring now to FIG. 5, there is illustrated a high-level logic flow diagram of a method for determining when to forward a request to be processed, in accordance with a preferred embodiment of the present invention. The sum of the estimated service times for requests outstanding in the distributed consensus protocol and the stimulus sequence is updated, as shown in block 501, when a request that is committed to the sequence is completed, as depicted in block 502, and when a new request is forwarded to the distributed consensus means to be committed to the sequence, as shown in block 503.

A determination is made as to whether the sum of the estimated service times is greater than the predetermined threshold service time, as shown in block 504. If the sum is greater than or equal to the threshold service time, then no new request is passed to the distributed consensus means, as depicted in block 506.

If the sum is less than the threshold service time, then the request manager proceeds with forwarding the next request to the distributed consensus means, as shown in block 508. The estimated time for the new request is looked up, as depicted in block 509, and the sum for outstanding requests is updated again.

III. Rule 3

Requests are selected to commit to the stimulus sequence with priority inversely proportional to the estimate of service time required.

a. The request manager calculates the sum S of 1/(service time estimate) over all clients with waiting requests. The inverse of the estimate is only added to the sum once even if there is more than one request waiting for that client.

b. The request manager selects a request randomly from those at the head of each client queue where the probability of selecting from a given client is [1/(service time estimate for that client)]/S.

c. The selected request is passed on to be committed to the stimulus sequence and the estimate of service time for the request is accounted for as described above which may result in the threshold being exceeded and the request manager stalling until a request completes or not in which case the request manager would go on to process another request as above.

IV. Rule 4

The system starts by assuming a worst-case initial estimate for a client's request service time.

The initial value chosen for the service time estimate for a client may be any non-zero value. In one embodiment, the threshold value is used as the initial estimate which has the effect of serializing requests from a client with respect to all other requests processed by the same request manager until the request manager has learned by feedback how long they take to execute. This is a conservative choice for an initial value which is robust in the face of changes in the implementation. In an alternative embodiment, the estimates could be saved after the system had been running for some time and the saved estimates used as initial estimates in subsequent invocations of the system.

Replicated state machines are used in many fault-tolerant applications and the described method and apparatus can be applied in many different environments including, but not limited to, storage subsystems and fault-tolerant virtual machines.

As has been described, the present invention provides an improved replicated state machine that can schedule requests from clients such that all clients can be serviced fairly.

It is also important to note that although the present invention has been described in the context of a fully functional data processing system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A tangible computer storage device comprising:
   a plurality of state machine replicas for concurrently executing a service in response to a request from a client;
   a request manager instance for associating with each of said state machine replicas, wherein said request manager instance includes:
      a distributed consensus means for committing a stimulus sequence of requests to be processed by each of said state machine replicas; and
      a selection means for selecting requests to be committed to said stimulus sequence, wherein a selection is based on an estimated service time of a request from a client,
   wherein said state machine replicas include feedback generating means for providing feedbacks to said request manager instance regarding said service time for said request from said client.

2. The tangible computer storage device of claim 1, wherein said estimated service time of said request from said client is based on a history of service times of requests from said client.

3. The tangible computer storage device of claim 1, wherein said request manager instance includes a control means for providing outstanding service time represented by requests in the process of being committed to said stimulus sequence and those in said stimulus sequence not yet processed by said state machine replicas, wherein said control means has a threshold time against which said outstanding service time is compared and requests are progressed or delayed accordingly.

4. The tangible computer storage device of claim 1, wherein said selection means selects a client from which to forward a request, wherein a probability of a client being selected is the inverse of said estimated service time for said client divided by a sum of an inverses of said estimated service times of each of said clients with one or more waiting requests.

5. The tangible computer storage device of claim 1, wherein said request is tagged with a reference to an originating client.

6. A tangible computer storage device having a computer program product for scheduling requests from clients to a replicated state machine, said tangible computer storage device comprising:
   computer program code for executing a service in parallel on a plurality of state machine replicas in response to a request from a client;
   computer program code for managing requests passed to each of said state machine replicas by:
      committing a stimulus sequence of requests to be processed by every replica; and
      selecting requests to be committed to the stimulus sequence from requests from multiple clients, wherein a selection is based on an estimated service time of said request from said client;
   wherein said state machine replicas include feedback generating means for providing feedbacks to said request manager instance regarding said service time for said request from said client.

7. The tangible computer storage device of claim 6, wherein said estimated service time of said request from said client is based on a history of service times of requests from said client.

8. The tangible computer storage device of claim 6, wherein said request manager instance includes a control means for providing outstanding service time represented by requests in the process of being committed to said stimulus sequence and those in said stimulus sequence not yet processed by said state machine replicas, wherein said control means has a threshold time against which said outstanding service time is compared and requests are progressed or delayed accordingly.

9. The tangible computer storage device of claim 6, wherein said selecting selects a client from which to forward a request, wherein a probability of a client being selected is the inverse of said estimated service time for said client divided by a sum of an inverses of said estimated service times of each of said clients with one or more waiting requests.

10. The tangible computer storage device of claim 6, wherein said request is tagged with a reference to an originating client.

* * * * *